United States Patent
Werner

(10) Patent No.: US 10,065,512 B2
(45) Date of Patent: Sep. 4, 2018

(54) VEHICLE HAVING A CHARGING DEVICE AND A METHOD FOR CHARGING AN ENERGY STORE OF A VEHICLE

(71) Applicant: Dr. Ing. h.c. F. Porsche Aktiengesellschaft, Stuttgart (DE)

(72) Inventor: Michael Werner, Besigheim (DE)

(73) Assignee: DR. ING. H.C.F. PORSCHE AKTIENGESELLSCHAFT, Stuttgart (DE)

(*) Notice: Subject to any disclaimer, the term of this patent is extended or adjusted under 35 U.S.C. 154(b) by 116 days.

(21) Appl. No.: 15/263,434

(22) Filed: Sep. 13, 2016

(65) Prior Publication Data

US 2017/0144557 A1    May 25, 2017

(30) Foreign Application Priority Data

Nov. 19, 2015    (DE) .................... 10 2015 120 050

(51) Int. Cl.
*H02J 7/00* (2006.01)
*B60L 11/18* (2006.01)

(52) U.S. Cl.
CPC ....... *B60L 11/1818* (2013.01); *B60L 11/1833* (2013.01); *B60L 11/1838* (2013.01); *B60L 11/1861* (2013.01); *H02J 7/0021* (2013.01); *H02J 7/0045* (2013.01); *B60L 2230/12* (2013.01); *Y02T 10/7005* (2013.01); *Y02T 10/7088* (2013.01); *Y02T 90/121* (2013.01); *Y02T 90/125* (2013.01); *Y02T 90/128* (2013.01); *Y02T 90/14* (2013.01); *Y02T 90/163* (2013.01)

(58) Field of Classification Search
CPC .................................................... B60L 11/1818
USPC ........................................................ 320/109
See application file for complete search history.

(56) References Cited

U.S. PATENT DOCUMENTS

| 5,297,650 A | 3/1994 | Gandiglio et al. | |
|---|---|---|---|
| 2013/0037339 A1* | 2/2013 | Hickox | B60L 11/182 180/167 |
| 2013/0076296 A1* | 3/2013 | Ushiroda | B60L 3/12 320/101 |
| 2013/0096994 A1* | 4/2013 | Jakob | B60L 11/1816 705/13 |
| 2013/0335021 A1* | 12/2013 | Meier | B60L 11/1818 320/109 |
| 2017/0253131 A1* | 9/2017 | Kilic | B60L 11/182 |

FOREIGN PATENT DOCUMENTS

| DE | 10 2010 048 386 | 4/2012 |
|---|---|---|
| DE | 10 2012 012 896 | 1/2014 |

OTHER PUBLICATIONS

German Search Report dated Nov. 26, 2015.

* cited by examiner

*Primary Examiner* — Suresh Memula
(74) *Attorney, Agent, or Firm* — Gerald E. Hespos; Michael J. Porco; Matthew T. Hespos

(57) ABSTRACT

A vehicle has a charging device for charging an energy store at a charging station. The charging device has a vehicle-side coupling element for coupling to a charging-station-side coupling element. A control unit is provided is arranged in the region of the vehicle-side coupling element for maneuvering the vehicle.

12 Claims, 1 Drawing Sheet

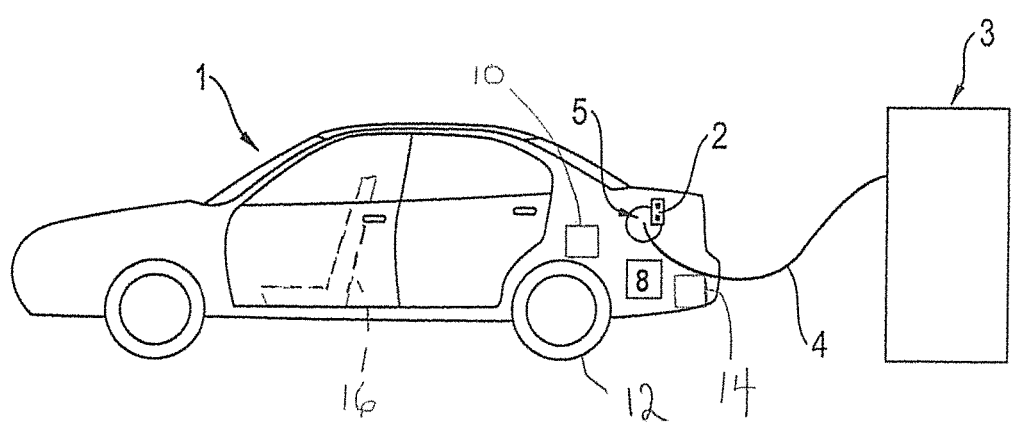

VEHICLE HAVING A CHARGING DEVICE AND A METHOD FOR CHARGING AN ENERGY STORE OF A VEHICLE

CROSS REFERENCE TO RELATED APPLICATION

This application claims priority under 35 USC 119 to German Patent Appl. No. 10 2015 120 050.3 filed on Nov. 19, 2015, the entire disclosure of which is incorporated herein by reference.

BACKGROUND

1. Field of the Invention

The invention relates to a vehicle having a charging device and to a method for charging an energy store of a vehicle.

2. Description of the Related Art

The prior art includes charging stations to charge energy stores of vehicles. These charging stations are located, for example, at gasoline stations. A charging cable typically is used to provide an electrically conductive connection between the energy store and the charging station to carry out the charging process.

An object of the present invention is to reduce the effort for a vehicle user when charging an energy store of the vehicle.

SUMMARY

The invention relates to a vehicle having a charging device for charging an energy store at a charging station. The charging device has a vehicle-side coupling element for coupling to a charging-station-side coupling element, and a control unit for maneuvering the vehicle is arranged in the region of the vehicle-side coupling element.

In contrast to the prior art, the control unit is arranged continuously or permanently in the region of the vehicle-side coupling element. As a result, it is no longer necessary to get into the vehicle again to move the vehicle if the vehicle assumes a first position that is unsuitable for coupling the charging-station-side coupling element and the vehicle-side coupling element if, for example, the charging cable is not sufficiently long to complete the connection. Instead, a user can move the vehicle into the desired second position is suitable for coupling from its position at the vehicle-side coupling element. In contrast with remote control systems that are not arranged permanently on the vehicle, the permanent arrangement in the vehicle has the advantage that the user can rely on the presence of the control unit and is not forced to think of the remote control system, for example in the form of a Smartphone, when he is about to charge the energy store.

The energy store may be a battery in the vehicle and provided for driving the vehicle. The vehicle-side coupling element and the charging-side coupling element may be configured to be complementary to one another so that they can be connected to one another by, for example, a manual, coupling mechanism. Furthermore, the vehicle can be moved and steered directly, in particular by means of direct inputs at the control unit. It is conceivable that an activated handbrake can be released with the control unit.

The charging device may comprise a charging cable and/or a charging socket integrated into the vehicle. For example, the charging cable is mounted in the interior of the vehicle, for example on a drum, and is pulled out of the vehicle when necessary, for example for charging. Furthermore, there is provision that the charging cable and/or the charging socket are protected by a protective element, for example a closure in the form of a fuel tank cover, against environmental influences.

The control unit may be arranged on the charging cable and/or on a charging socket of the vehicle. As a result, the control unit advantageously is arranged directly on the vehicle-side coupling element and is directly accessible to the user.

The control unit may comprise an input device and/or an information playback device. The vehicle can be controlled in a user-friendly fashion by the input device, for example in the form of pushbutton keys, a control knob and/or a rotary disc. Furthermore, the control unit may be arranged pivotably on the vehicle so that the control unit advantageously can be pivoted by the user into a position that is preferred by the user when the user inputs his commands into the control unit. The information playback device may be configured to inform the user about the position of the vehicle. The information playback device may be a display. As a result, helpful information, for example about objects outside his field of vision or about the distance from the charging station, can be communicated directly to the user. It is also conceivable that the information playback device warns the user about any risks by outputting signals.

The vehicle may comprise a monitoring device for monitoring the state of the vehicle. The monitoring device may monitor whether a driver's seat is occupied. It is therefore possible to ensure, for example, that the control unit cannot be activated when the driver's seat is occupied. The monitoring device also may be configured as an authentication system on the control unit to prevent misuse of the control unit. It is also conceivable that the steering system in the passenger compartment of the vehicle may be configured to have preference over steering by the control unit.

The invention also relates to a system for charging an energy store of a vehicle comprising a charging station and a vehicle having a charging device for charging an energy store at a charging station. The charging device may have a vehicle-side coupling element for coupling to a charging-station-side coupling element, and a control unit is provided in the region of the vehicle-side coupling element or at the charging station for maneuvering the vehicle.

As a result of the permanent arrangement in the region of the vehicle-side coupling element or the charging station, the control unit for maneuvering the vehicle is available to the user at the location at which he is already situated in any case when he wishes to charge the vehicle. There is no longer a need for the user to get into the vehicle and subsequently move the vehicle for any possible subsequent maneuvering. With the arrangement at the charging station, the control unit communicates with a receiver in the vehicle by a wireless communication link.

The invention also relates to a method for charging an energy store of a vehicle having a charging device. The method includes a first step of moving the vehicle into a first position relative to a charging station, and a second step of moving the vehicle into a second position relative to the charging station by means of a control direction arranged in the region of the charging device.

The method of the invention may further include a third step of charging the energy store of the vehicle.

Further details, features and advantages of the invention emerge from the drawing and from the subsequent description of preferred embodiments with reference to the drawing. The drawing illustrates here merely an exemplary embodiment of the invention and does not restrict the essential inventive concept.

BRIEF DESCRIPTION OF THE DRAWINGS

FIG. 1 shows a charging station and a vehicle according to an exemplary embodiment of the invention.

DETAILED DESCRIPTION

FIG. 1 illustrates a system comprising a charging station 3 and a vehicle 1 according to an exemplary embodiment of the invention. The vehicle 1 has an energy store 8, such as a traction battery that preferably is internal to the vehicle 1 and that is used to deliver power to an electric machine 10 to drive at least one wheel 12 of the vehicle 1. The energy store 8 may be charged at a charging station by a method that includes a first method step of moving the vehicle 1 into a first position in proximity to the charging station 3. The vehicle 1 comprises a charging device by means of which an electrically conductive connection to the charging station 3 can be established. For this purpose, the charging device preferably comprises a vehicle-side coupling element for coupling to a charging-station-side coupling element that is configured in a complementary fashion. The vehicle-side coupling element and the charging-station-side coupling element may define a pair of matable plugs that can be plugged-together to bring about an electrically conductive connection between the energy store 8 and the charging station 3. The vehicle-side coupling element preferably has a charging socket 5 and/or a charging cable 4. In this context it is conceivable, for example, that the charging cable 4 is integrated into the vehicle 1 and is rolled up on a charging drum in the rear region of the vehicle 1. The charging cable 4 then may be unrolled from the charging drum to span a distance between the charging station 3 and the vehicle 1 so that the energy store 8 in the vehicle can be charged. It is also conceivable that the charging cable 4 is integrated into the charging station 3. A control unit 2 for maneuvering the vehicle 1 is arranged in the region of the vehicle-side coupling element. For example, the control unit 2 is arranged in the charging socket 5, on the charging cable 4 or on an inner side of a fuel tank cover that is used to protect the charging socket 5 against environmental influences when the energy store 8 is not currently being charged. In the context, the control unit 2 is configured to initiate and/or control a maneuvering of the vehicle 1 relative to the charging station 3, i.e. so that the vehicle 1 can be moved into a second position relative to the charging station 3. If the user of the vehicle 1 determines that the first position, i.e. the original parked position proves to be unfavorable for coupling the vehicle-side coupling element and the charging-station-side coupling element, for example because the charging cable 4 is too short to span the distance between the vehicle 1 and the charging station 3, the vehicle 1 advantageously can be moved into a second position by means of the control unit 2 without the user having to get into the vehicle 1 again. The vehicle also has a monitoring device 14 for monitoring the state of the vehicle 1. The monitoring device 14 may to monitor whether a driver's seat 16 is occupied. It is therefore possible to ensure, for example, that the control unit 2 cannot be activated when the driver's seat 16 is occupied. Furthermore, the arrangement of the control unit 2 in the region of the vehicle-side coupling element proves advantageous because in the situation of charging the user stays in the region of the vehicle-side coupling element, for example at the charging socket 5 and/or the charging cable 4. The permanent arrangement of the control unit 2 also provides the advantage that the user does not necessarily have to think of additional equipment such as, for example, a Smartphone or some other mobile user unit to be able to perform subsequent maneuvering of the vehicle 1. Furthermore, the vehicle 1 may have an information playback device, for example in the form of a display. In particular, the information playback device is provided for detecting possible sources of danger during the maneuvering with the control unit 2. For example, signals from the monitoring device 14 are communicated to the control unit 2 to warn the user that a minimum distance from an object arranged in the surroundings is undershot, as well as a location of the object. Furthermore, it is conceivable that the information playback device indicates the distance between the vehicle 1 and the charging station 3 and preferably informs the user that the distance permits use of the charging cable. To prevent misuse of the control unit 2, there is preferably provision that the control unit 2 is configured so that it cannot be activated by the user until after authentication or identification. It is also conceivable that the control unit 2 is configured in such a way that it communicates with the charging station 3 and can only be used in the surroundings of the charging station 3.

According to an alternative embodiment of the system, the control unit 2 is arranged at the charging station 3 and communicates with the vehicle 1 in a wireless fashion, for example via a close-range communication device.

What is claimed is:

1. A vehicle comprising: an energy store; an electric machine configured to receive power from the energy store and to drive at least one wheel of the vehicle; a charging device for charging the energy store at a charging station, the charging device having a vehicle-side coupling element configured for coupling to a charging-station-side coupling element; and a control unit connected to the electric machine and configured to cause the electric machine to maneuver the vehicle relative to the charging station, the control unit being arranged in the region of the vehicle-side coupling element and being accessible from the outside of the vehicle.

2. The vehicle of claim 1, wherein the charging device comprises a charging cable and/or a charging socket integrated into the vehicle.

3. The vehicle of claim 2, wherein the control unit is arranged on the charging cable and/or on the charging socket of the vehicle.

4. The vehicle of claim 1, wherein the control unit comprises an input device and/or an information playback device.

5. The vehicle of claim 1, wherein the vehicle comprises a monitoring device for monitoring a state of the vehicle.

6. The vehicle of claim 1, further wherein the control unit is arranged directly on the vehicle-side coupling element.

7. The vehicle of claim 1, wherein the control unit includes a user input device.

8. The vehicle of claim 1 further comprising a driver's seat, the control unit being configured to sense whether the driver's seat is occupied and permitting maneuvering of the vehicle only when the driver's seat is not occupied.

9. A system for charging an energy store of a vehicle comprising a stationary charging station and a vehicle with an energy store, an electric machine configured to receive power from the energy store and to drive at least one wheel of the vehicle, a charging device for charging the energy store of the vehicle when the vehicle is at the charging station, the charging device having a vehicle-side coupling element configured for coupling to a charging-station-side coupling element; and a control unit connected to the electric machine and configured to cause the electric machine to maneuver the vehicle relative to the stationary charging station, wherein the control unit is arranged in the region of the vehicle-side coupling element and is accessible from outside the vehicle.

10. A method for charging an energy store of a vehicle having a charging device, the method comprising: moving the vehicle into a first position relative to a charging station; and then using a control unit arranged in a region of the charging device and accessible from a location external of the vehicle for maneuvering the vehicle into a second position relative to the charging station; and then charging the energy store of the vehicle.

11. The method of claim 10, further comprising determining whether a driver's seat of the vehicle is occupied, and preventing use of the control unit for maneuvering the vehicle into the second position if the driver's seat of the vehicle is occupied.

12. The method of claim 10, further comprising using a monitoring device on the vehicle for monitoring locations of objects in proximity to the vehicle and distances between the vehicle and the objects, and then using the locations and the distances determined by the monitoring device for controlling the maneuvering of the vehicle to the second position.

* * * * *